J. K. Mayo.

Ship Building.

No. 3,087. Reissued Aug. 18, 1868.

Witnesses:

N. W. Deming
N. H. Bureton

Inventor

John K. Mayo
By Hughes Bros. Atty

United States Patent Office.

JOHN K. MAYO, OF NEW YORK, N. Y., FOR HIMSELF, AND ANDRE CUSHING AND GEORGE B. CUSHING, OF ST. JOHN, NEW BRUNSWICK, ASSIGNEES OF JOHN K. MAYO.

*Letters Patent No.* 51,735, *dated December* 26, 1865; *reissue No.* 3,087, *dated August* 18, 1868.

DIVISION C.

IMPROVEMENT IN THE CONSTRUCTION OF SHIPS, BOATS, BUOYS, AND OTHER NAUTICAL AND MARINE STRUCTURES.

The Schedule referred to in these Letters Patent and making part of the same.

TO ALL WHOM IT MAY CONCERN:

Be it known that JOHN K. MAYO, formerly of Portland, Maine, but now of the city, county, and State of New York, invented an Improvement in Nautical or Marine Structures and Appliances; and we hereby declare the following to be a sufficiently full, clear, and exact description thereof to enable one skilled in the art to which the said invention appertains to carry it into effect, reference being had to the accompanying drawings, which are made a part of this specification.

The invention consists in forming various nautical or marine structures and appliances of a plurality of thin sheets or plates of wood, cemented or otherwise firmly connected together, with the grain of the several scales or thicknesses crossed or diversified, so that they will afford to each other mutual strength, support, and protection against checking, splitting, warping, expansion, and contraction.

Figure 2 illustrates the application of the invention to masts, spars, and the like.

Figure 1:
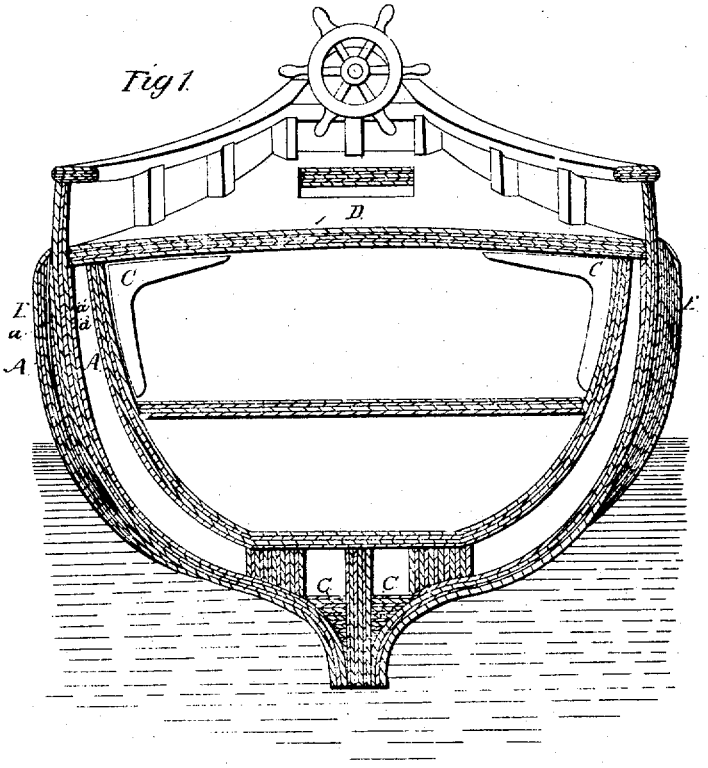
Figure 1 is a transverse sectional view of a vessel, illustrating various applications of the invention.
Figure 2:
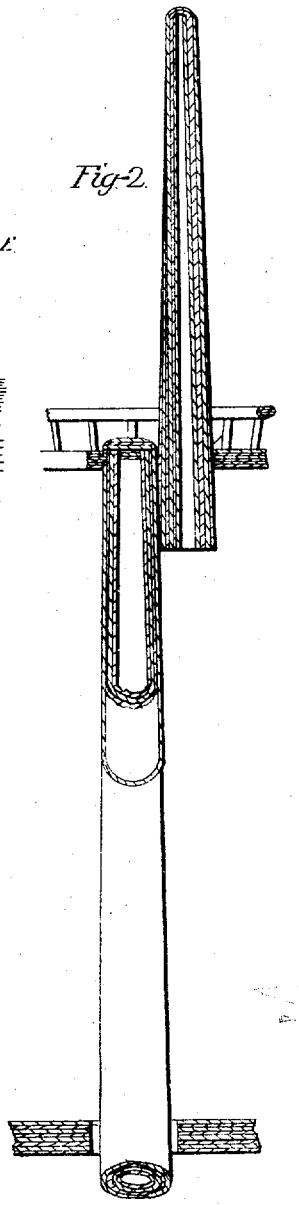
Figure 3:
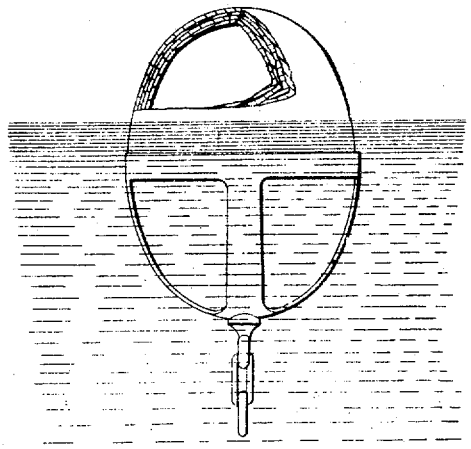
Figure 3 represents a perspective view of a buoy.

The hull of a vessel may be constructed with two shells, A A′, each made up of a number of thin sheets or plates of wood, $a$ $a^1$ $a^2$, firmly connected together by the aid of cement, with the grain crossed or diversified in direction.

C C represent angle-pieces of the similar laminated wood or compound scale-board, made up in suitable forms.

The deck D is made of a number of scales or sheets similarly connected together.

E represents armor-plating, which is also constructed of wood, laid up in thin scales or plates.

The advantage of this material for marine structures is manifest, when it is seen that by the use of scale-board or thin sheets of wood, firmly cemented or fastened together, with the grain crossed or diversified, as described, we approach to the strength and tenacity of metals, while retaining the lightness and buoyancy of wood, and at the same time, by means of the cement, preserved from decay.

Another great advantage is in the fact that this combined scale-board is not subject to shrinking or swelling by atmospheric changes; hence the leakage of vessels so built would be nearly or quite done away with.

In constructing a vessel of this material, sheets or planks may be prepared, and fastened upon a frame or skeleton, in sections similar to the present method of constructing iron ships, or, in some instances, it may be applied in one continuous seamless web, or, if preferred, all framing may be dispensed with, and the shell or plurality of shells may answer every purpose of strength, by placing partitions of some material as substitutes for beams, said partitions forming water-tight compartments.

The space between outer and inner shells may be used, as has been done in vessels of the monitor class, for the admission of water, to depress the ship in action; or in mercantile ships, by well-arranged stops, the water may be used for ballast, or for trimming the ship with great facility.

This material may also be used as a shot-proof cladding for war-ships, in place of iron, a small fraction of the weight of iron being equal or superior proof-protection, and yet the risk of splinters, so dangerous to life in the common wooden ships, would be entirely done away with.

Masts and spars may be made very light and very strong, in hollow or cylindrical forms, and be put together in section, by any of the ordinary means used to connect cylinders or pipes; or, if found preferable, they may be made up continuously, in one entire length, as required.

The invention is applicable to the formation or construction of ships, both sailing and steam, for commercial, pleasure, or war purposes, or parts thereof, such as beams, knees, keels, kelsons, stem and stern-posts, rudders, frames, foot-hooks, masts, spars, bowsprits, booms, blocks, bulk-heads, planking, ceiling, sheathing, decks, centre-boards, mast-hoops, travellers, pilot-stands, steering-wheels, &c., &c.; also for boats, life-boats and row-boats, race-boats, and all varieties, life-preserving seats, life-preservers, buoys, floats, rafts, beacons, light-houses.

Buoys for channels or headland-guides will be found very superior made of this material, inasmuch as they are more buoyant, and, being light, are less liable to damage by contact than any kind of metal buoy, or to inflict damage in contact with vessels.

This material is particularly adapted for the cheap and efficient construction of light-houses and beacons.

But it is unnecessary to enumerate all the articles and structures to which the invention is applicable in marine or naval architecture; suffice it to say it may be applied in all cases where lightness, strength, or durability is requisite or desirable.

The following is what is claimed as new in the invention of JOHN K. MAYO:

The employment or use of the compound scale-board hereinbefore described, in the formation of the specified or analogous nautical structures.

JOHN K. MAYO.

Witnesses:

EDWARD WILLARD,

S. W. FROST.